United States Patent [19]

Hutchins et al.

[11] Patent Number: 4,470,089
[45] Date of Patent: Sep. 4, 1984

[54] TAPE UNIT CLEANING DEVICE

[75] Inventors: Bruce A. Hutchins, Rocheport; Richard Fay, Columbia, both of Mo.

[73] Assignee: International Jensen Incorporated, Schiller Park, Ill.

[21] Appl. No.: 332,822

[22] Filed: Dec. 21, 1981

[51] Int. Cl.³ .................... G11B 23/50; G11B 5/41
[52] U.S. Cl. .................... 360/137; 360/128; 15/246
[58] Field of Search .................... 360/137, 128; 15/DIG. 12, 210 R

[56] References Cited

U.S. PATENT DOCUMENTS 3,955,214  5/1976  Post et al. ............................ 360/128
3,961,375  6/1976  Mika et al. ........................... 360/137
4,388,663  6/1983  Becella ................................ 360/128

OTHER PUBLICATIONS

U-Matic Recorder Cleaner Instructions.

Primary Examiner—Bernard Konick
Assistant Examiner—Paul Stefanski
Attorney, Agent, or Firm—William, Brinks, Olds, Hofer, Gilson & Lione, Ltd.

[57] ABSTRACT

A cleaning cassette for a tape unit includes a supply reel and a take-up reel, with a cleaning ribbon mounted therebetween. The cleaning ribbon extends around various support surfaces in the cassette, and passes two cleaning stations. The first cleaning station utilizes a spring biased plunger to force the cleaning ribbon against a pinch roller being cleaned. A traction sleeve is positioned between the capstan and the pinch roller to enhance the frictional engagement between the capstan and the pinch roller. At the second cleaning station, the cleaning ribbon passes between the capstan and the pinch roller. Once again, a traction sleeve is provided between the capstan and the pinch roller, and in this case the traction sleeve is offset with respect to the cleaning ribbon. Funnel-shaped openings and distribution channels are provided in the said shell to introduce a liquid such as a cleaning solvent onto the cleaning ribbon near the cleaning stations. A ratchet mechanism is provided on the take-up reel to insure that the only motion of the ribbon is from the supply reel to the take-up reel.

31 Claims, 6 Drawing Figures

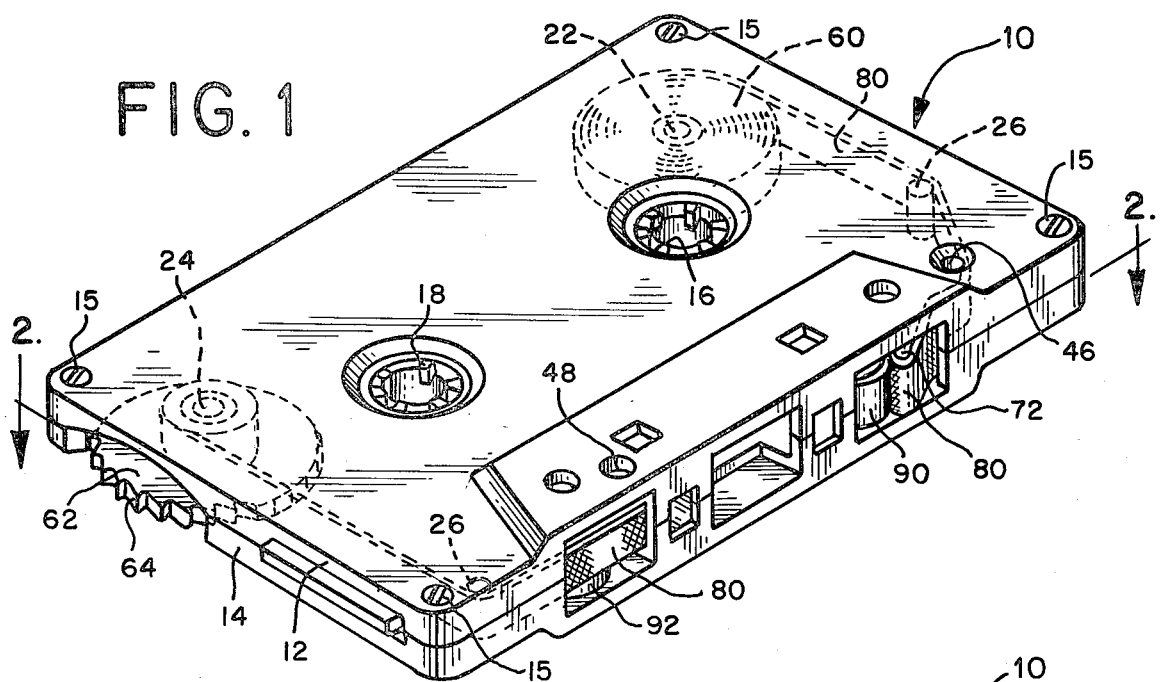
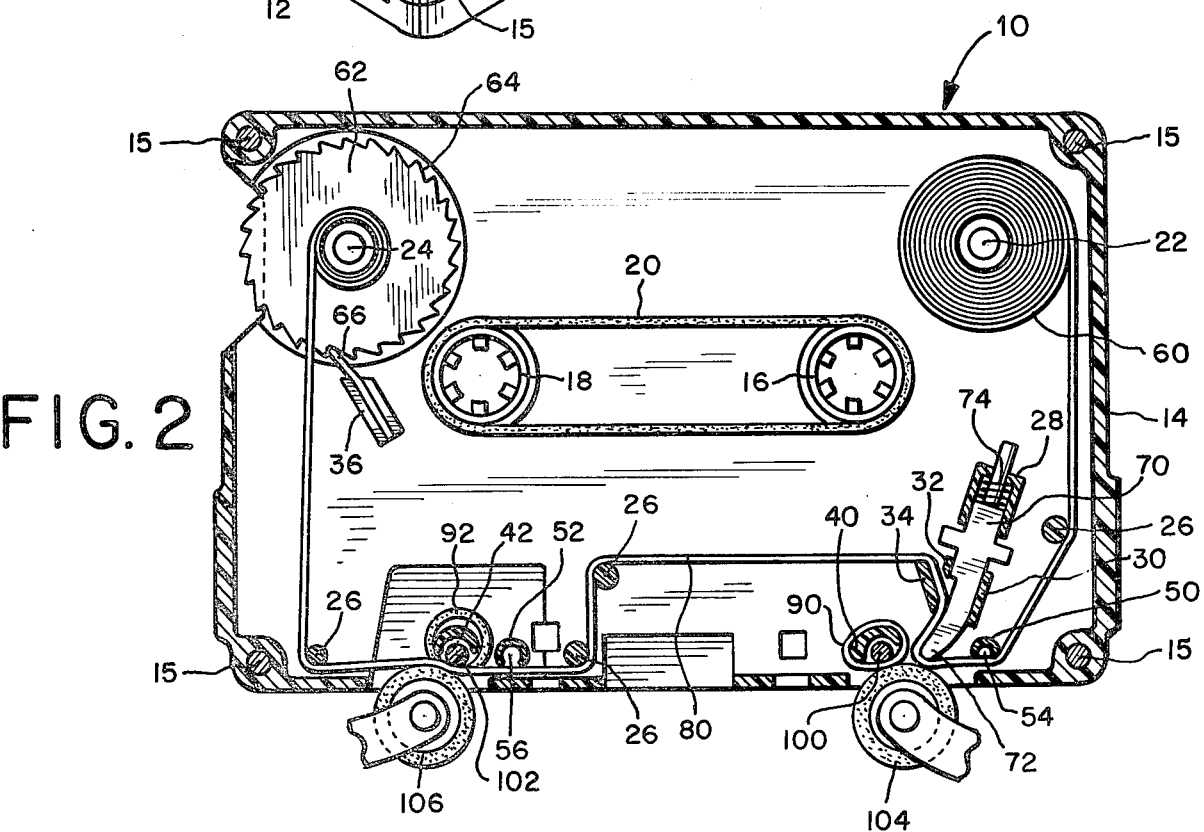

TAPE UNIT CLEANING DEVICE

BACKGROUND OF THE INVENTION

This invention relates to an improved cleaning device for cleaning rotatable elements such as capstans and pinch rollers of tape recording and playback equipment. Throughout the following application the term "tape unit" will be used in its broad sense to encompass equipment for recording or playing back audio, video, digital data storage, or other magnetic tapes.

It has been known for some time that as tape units are used, rotatable elements such as capstans and pinch rollers may build up deposits of materials such as metal oxides removed from magnetic tapes. Such deposits can materially and adversely affect the performance of tape units. For example, deposits on capstans and pinch rollers can interfere with the smooth and constant speed movement of magnetic tape in a tape unit. In addition, such deposits can cause a tape unit to jam or physically damage a magnetic tape being played.

The present invention is directed to an improved, self-contained cleaning unit which can simply be used and which can readily be designed to operate effectively with pinch rollers of varying geometries in order to provide adequate cleaning of capstans and pinch rollers.

SUMMARY OF THE INVENTION

According to a first feature of this invention, a housing is provided with a supply reel and a cleaning ribbon wound on the reel. The cleaning ribbon is positioned in the housing to come into contact with at least one rotatable element of a tape unit, and the cleaning ribbon can readily be advanced when desirable or necessary to present a fresh, clean portion of the cleaning ribbon to the rotatable element. This aspect of the invention provides a conveniently renewable cleaning surface, in that the cleaning ribbon can be advanced as necessary to ensure proper cleaning action.

According to a second feature of this invention, at least one traction sleeve is provided. This traction sleeve is mounted in the housing so as to surround a capstan when the housing is placed in a tape unit. The traction sleeve is designed to come between the capstan and the pinch roller in order to enhance the frictional engagement between the capstan and the pinch roller.

It is often preferable to use cleaning liquids to increase the efficiency with which deposits can be removed from capstans and pinch rollers. However, in the past such liquids have on occasion resulted in inadequate friction between the metal capstan and the elastomeric pinch roller such that the capstan is no longer capable of rotating the pinch roller. When this happens, inadequate rotation of the pinch roller may result in unacceptably poor cleaning action against the surface of the pinch roller.

The traction sleeves of this invention operate to overcome this disadvantage by providing an engagement area between the capstan and the traction sleeve which is protected from contact with cleaning liquids. Thus, the capstan-traction sleeve interaction area is kept dry, and the frictional engagement between the capstan and the traction sleeve is kept at a suitably high value. In the preferred embodiment, the traction sleeve is made of an elastomeric material chosen such that, even when wetted by cleaning liquids, the friction between the traction sleeve and the pinch roller is adequate to enable the capstan to rotate the pinch roller. In this way, adequate rotation of the pinch roller is obtained, even in the presence of cleaning liquids, and cleaning of the pinch roller is enhanced. As will be described in detail below, a preferred embodiment of this invention utilizes two separate traction sleeves of differing configurations in order effectively to clean capstans and pinch rollers that vary in geometry.

The traction sleeve aspect of this invention enables the capstan to rotate the pinch roller, even under considerable frictional loading. Thus, the traction sleeve of this invention enables the use of a spring biased swabbing plunger to press a cleaning medium (such as the cleaning ribbon described above), against the pinch roller as the pinch roller is being rotated by the capstan. In this way, excellent cleaning of the pinch roller is obtained.

The invention itself, together with further objects and attendant advantages, will best be understood by reference to the following detailed description taken in conjunction with the accompanying drawings.

BRIEF DESCRIPTION OF THE DRAWINGS

FIG. 1 is a perspective view in partial cutaway of the presently preferred embodiment of this invention.

FIG. 2 is a sectional view taken along line 2—2 of FIG. 1.

DETAILED DESCRIPTION OF THE PRESENTLY PREFERRED EMBODIMENT

Figure 3:
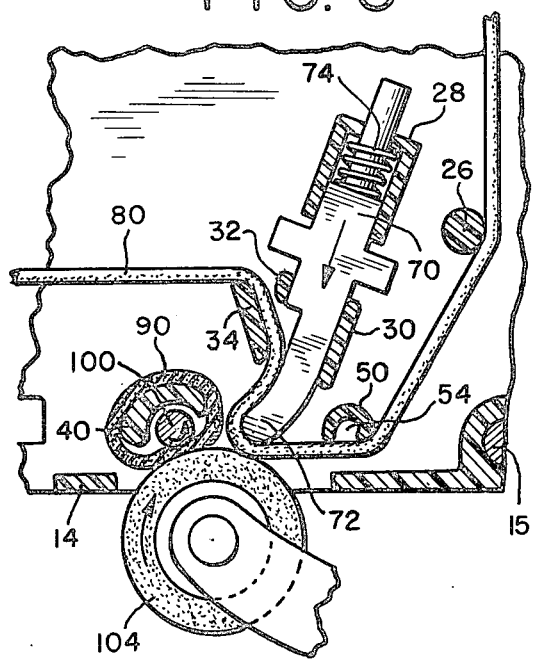
FIG. 3 is a detailed sectional view taken in the plane of FIG. 2 showing the swabbing plunger and the first traction sleeve of the embodiment of FIG. 1.

Turning now to the drawings, FIGS. 1 and 2 show overall views of the presently preferred embodiment of this invention. As shown in FIG. 1, this embodiment includes a housing 10, which can for example be dimensioned and shaped as a standard cassette shell. Though the shell 10 is shown as a Phillips type cassette, the invention can readily be adapted to other types of cassettes, such as Beta, VHS, and the like. Of course, the shape and size of the housing should be chosen to fit the particular tape unit to be cleaned. The cassette shell 10 is made of two partial sections 12,14 which are held together at the corners by fasteners 15.

As best shown in FIG. 2, two hubs 16,18 are rotatably mounted in the shell 10. These two hubs 16,18 are coupled together by means of a belt 20. As will be apparent from the following description, the hubs 16,18 and belt 20 perform no cleaning function in the cleaning apparatus of this invention. Rather, they serve to defeat the automatic shut-off circuitry found in many tape units in order to enable the tape unit to operate normally in the absence of a tape being transported by the capstans and pinch rollers.

The second section 14 of the shell 10 defines first and second axles 22,24 positioned as shown. In addition, the second section 14 defines a number of support surfaces 26 which are positioned to support and orient a cleaning ribbon 80, as will be described in detail below. This second section 14 of the shell 10 also defines a plunger mounting structure 28, plunger guides 30,32,34, as well as pawl mounting structure 36. Two traction sleeve retaining posts 40,42, both having a generally crescent shaped cross-section, are also provided as part of the second section 14. The second traction sleeve retaining post 42 cooperates with and is positioned adjacent to a traction sleeve vertical positioning surface 44 defined by the first section 12 of the shell 10. The function and operation of these elements of the device will be described below in detail in conjunction with FIGS. 3 through 6.

The shell 10 also defines means for introducing a liquid, such as a cleaning liquid for example, onto the cleaning ribbon 80. This means comprises two funnel-shaped openings 46,48 which pass through the first section 12 of the shell 10. The second section 14 of the shell 10 defines two distribution channels 50,52, each of which is crescent shaped in cross-section and extends between the first and second sections 12,14. Each of distribution channels 50,52 defines a central bore 54,56 which is open along one edge and which is aligned with and in fluid communication with the respective funnel-shaped opening 46,48. Thus, fluid introduced into the shell 10 via the funnel-shaped openings 46,48 passes into the bores 54,56 of the distribution channels 50,52. As will be explained in detail below, liquid passes directly from the bores 54, 56 onto the cleaning ribbon 80.

Turning now to the movable parts of this embodiment, a supply reel 60 is rotatably mounted on the axle 22, and a take-up reel 62 is rotatably mounted on the axle 24. The outermost periphery of the take-up reel 62 defines a plurality of ratchet teeth which cooperate with a ratchet pawl 66 mounted in the pawl mounting structure 36 on the second section 14 of the shell 10. The ratchet teeth on the circumference of the take-up reel 62 also are accessible from the outside of the shell 10 and function as a thumb wheel 64. The ratchet teeth and the ratchet pawl 66 cooperate to restrict the rotational movement of the take-up reel 62 to a forward direction (clockwise as seen in FIG. 2).

A movable swabbing plunger 70 is mounted in the plunger mounting structure 28 so as to move in a rectilinear manner, as guided by the plunger guides 30, 32,34. The tip 72 of the plunger 70 is positioned adjacent the traction sleeve retaining post 40. A spring 74 is mounted between the plunger mounting structure 28 and the plunger 70 so as to bias the plunger 70 away from the plunger mounting structure 28.

A cleaning ribbon 80 is wound on the supply reel 60 and the take-up reel 62 shown in FIG. 2. This cleaning ribbon 80 extends from the supply reel 60, around the support surfaces 26, the distribution channels 50,52, to the take up reel 62. Rotation of the thumb wheel in the positive direction (clockwise as seen in FIG. 2) causes the ribbon 80 to advance in the housing from the supply reel 60 to the take-up reel 62. As the ribbon 80 advances, clean portions of the ribbon 80 are brought adjacent the plunger 70 and the traction sleeve retaining post 42. The ratchet pawl 66 simultaneously serves to prevent the take-up reel 62 from rotating in a reverse direction, and to provide a series of audible clicks which can be used to gauge the advancement of the cleaning ribbon 80.

The embodiment shown in the drawings also includes two traction sleeves 90,92. The first traction sleeve 90 is mounted over the traction sleeve retaining post 40 such that the traction sleeve 90 fits the retaining post 40 closely, yet is free to rotate.

The traction sleeve 90 is relatively wide and extends over substantially the entire width of the cleaning ribbon 80, in alignment therewith. The circumference of the traction sleeve 90 should be small enough to prevent the sleeve 90 from becoming entangled with or jammed in the ribbon 80, yet large enough to permit the sleeve 90 to rotate about the retaining post 40.

The second traction sleeve 92 differs from the first in that it is substantially larger in circumference and is positioned out of alignment with the ribbon 80. The larger circumference of the second traction sleeve 92 is possible because jamming of the traction sleeve 92 is less of a problem, due to the fact that it is offset with respect to the cleaning ribbon 80. The vertical positioning surface 44 serves to retain the second traction sleeve 92 in its offset position.

The shell 10 can be formed of any suitable material, such as a medium impact styrene for example. Preferably, moving parts such as the reels 60,62, the hubs 18,20, and the plunger 70 are formed of a plastic material such as Delrin. In this embodiment, both the traction sleeves 90,92 and the belt 20 are formed of an elastomeric material such as neoprene having a 60 durometer rating. In this preferred embodiment the first traction sleeve 90 has an inner diameter of about 0.279 inches, a height of about 0.173 inches, and a thickness of 0.020 inches. The second traction sleeve 92 has an inner diameter of about 0.300 inches, a height of about 0.104 inches, and a thickness of about 0.035 inches. The pawl 66 is preferably made of a strip of spring steel.

The cleaning ribbon 80 of this preferred embodiment is a cotton ribbon having a width of about 3/16 of an inch and a thickness of about 0.015 inch under compression. A suitable cotton ribbon is sold by Jean Ribbon Mills of Passaic, N.J. as part No. 8820.

Turning now to FIGS. 3 to 6, the functioning and operation of this preferred embodiment will now be described. In use, the shell 10 is inserted into a tape unit such that a capstan 100,102 (if present) is inserted within each of the traction sleeves 90,92, respectively. The cleaning device of this invention is preferably used with the cleaning ribbon 80 in a stationary position and the capstans 100,102 and pinch rollers 104,106 of the tape unit in rotary motion.

FIG. 3 shows a sectional view of the portion of the preferred embodiment around the first traction sleeve 90 in use. As shown in FIG. 3, the capstan 100 fits within the traction sleeve 90, and the traction sleeve 90 is disposed between the capstan 100 and the adjacent pinch roller 104. Thus, when the capstan 100 is rotated, it rotates the traction sleeve 90, which in turn rotates the pinch roller 104. The cleaning ribbon 80 extends against the distribution channel 50 adjacent the bore 54 such that liquid introduced into the bore 54 is distributed along the entire width of the cleaning ribbon 80 adjacent the pinch roller 104. The spring biased plunger 70 operates to push the cleaning ribbon 80 against the pinch roller 104. As the capstan 100 rotates, the pinch roller 104 is caused to rotate against the portion of the ribbon 80 adjacent the plunger tip 72. Cleaning liquids travel from the distribution channel 50 to the region of the ribbon 80 adjacent the plunger tip 72 in order to facilitate cleaning.

The traction sleeve 90 insures positive frictional engagement between the capstan 100 and the pinch roller 104, while the plunger 70 insures that adequate swabbing pressure is exerted on the ribbon 80 against the pinch roller 104. It will be noted that the traction sleeve 90 entirely surrounds the capstan 100 and protects the capstan 100 from cleaning liquid on the ribbon 80. In this way, the interaction area between the capstan 100 and the traction sleeve 90 is kept dry to provide good frictional engagement between the metal capstan 100 and the elastomeric traction sleeve 90.

Figure 4:
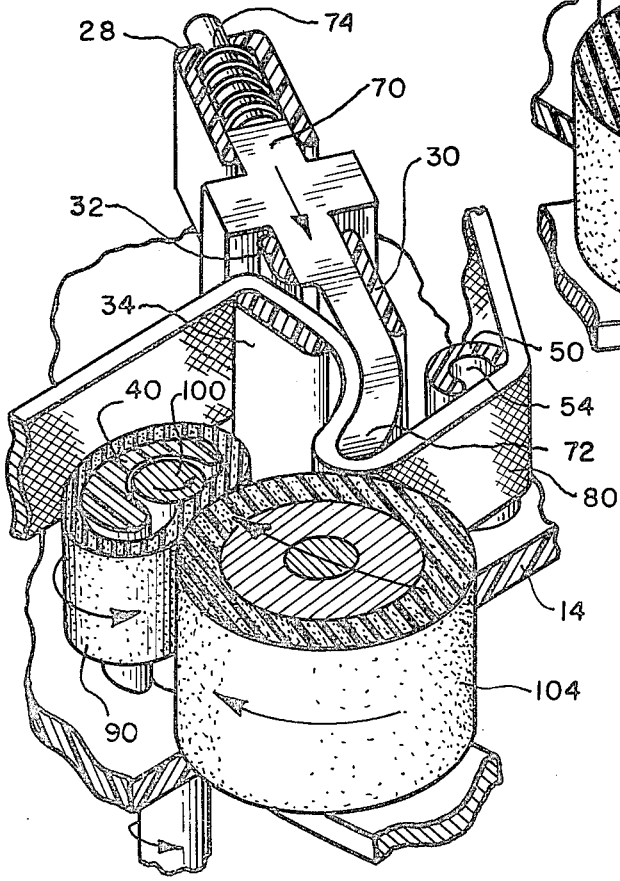
FIG. 4 is a fragmentary perspective view of the first traction sleeve shown in FIG. 3.

FIG. 4 shows a partial perspective view of the manner in which the traction sleeve 90 cooperates with the capstan 100, the pinch roller 104, the ribbon 80, and the plunger 70.

Figure 5:
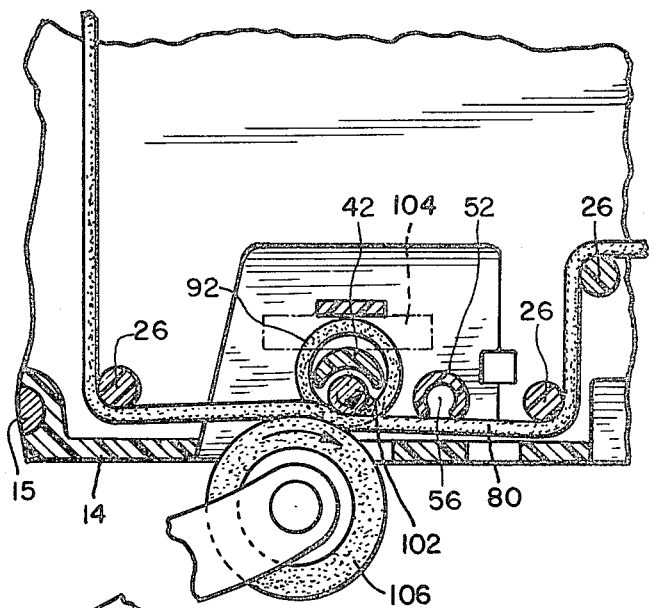
FIG. 5 is a detailed sectional view taken in the plane of FIG. 2 showing the second traction sleeve of the embodiment of FIG. 1.
Figure 6:
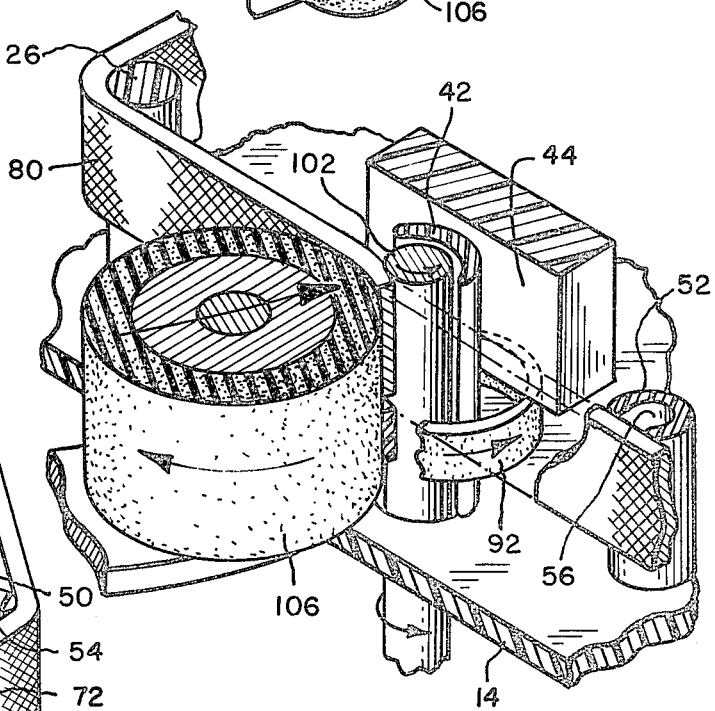
FIG. 6 is a fragmentary perspective view of the section traction sleeve of FIG. 5.

Turning now to FIGS. 5 and 6, the second traction sleeve 92 operates in a somewhat different manner. As shown in FIG. 5, the ribbon 80 extends between the capstan 102 and the pinch roller 106. Thus, as the capstan 102 rotates it is cleaned by one side of the ribbon 80, and as the pinch roller 106 rotates it is cleaned by the other side of the ribbon 80. As the ribbon 80 does not move with the rotation of the capstan 102, it is the traction sleeve 92 (which is offset with respect to the ribbon 80) which effects the desired frictional engagement between the capstan 102 and the pinch roller 106. In this case, it is the distribution channel 52 which conducts cleaning liquid via the bore 56 to the ribbon 80 adjacent the pinch roller 106.

In order fully to understand the advantages of the preferred embodiment described above, it is important to recognize that various tape units have various styles and types of pinch rollers, and that tape units can either include tape guides adjacent the pinch rollers or not. The two cleaning stations adjacent the two traction devices 90,92 have been particularly designed so that most of the commonly used configurations of pinch rollers will be cleaned by at least one of the two cleaning stations.

For example, the cleaning station adjacent the traction sleeve 90 operates particularly well with thin pinch rollers and with pinch rollers that do not employ tape guides. This is because the traction sleeve 90 extends over substantially the full width of the normal magnetic tape, and thus frictional engagement between the traction sleeve 90 and the pinch roller 104 is insured. This first cleaning station operates to clean the pinch roller 104 but not the capstan 100 in view of the fact that the traction sleeve 90 completely protects the capstan 100 from contact with the ribbon 80.

The second cleaning station adjacent the traction sleeve 92 operates well with pinch rollers having tape guides. This is because the ribbon 80 passes directly between the capstan 102 and the pinch roller 106, and therefore is not obstructed by the presence of tape guides. Furthermore, the second cleaning station adjacent traction sleeve 92 operates simultaneously to clean both the capstan 102 and the pinch roller 106.

In use, it is preferable first to insert the shell 10 in a first orientation in a tape unit, and then to operate the tape unit for a period of time before removing the shell 10 and inverting it into a second orientation. The tape unit is operated again to repeat the cleaning process. By operating the tape unit with the cassette shell in both of the two possible orientations, both of the capstans 100,102 and pinch rollers 104,106 are positioned at both cleaning stations.

From the foregoing description it should be apparent that the embodiment described above provides a number of important advantages. It provides a simple, self-contained system which allows the cleaning ribbon 80 to be advanced when necessary to provide a fresh cleaning surface. In addition, it provides means for positively rotating the pinch rollers in order to provide excellent pinch roller cleaning against the ribbon 80. The differences in the two cleaning stations enable this device to work well with a wide variety of geometries and configurations of pinch rollers and tape guides. Futhermore, the spring biased plunger and the distribution channels provide improved cleaning action.

Of course, it should be understood that numerous changes and modifications to the preferred embodiment described above will be apparent to those skilled in the art. For example, in alternate embodiments it may be desirable to dispense with the take-up reel 62 and to provide a device in which used ribbon passes out of the housing 10 and is cut off and discarded. Furthermore, in some embodiments the axle 22 may actually serve as a supply reel. Moreover, the housing may be shaped as needed to fit the tape unit being cleaned. For example, this invention may readily be adapted for other types of cassettes such as various types of video cassettes, and housing may be designed for use with tape units which do not use cassettes.

It is therefore intended that the foregoing detailed description be regarded merely as illustrative of the presently preferred embodiment of this invention. It is the following claims, including all equivalents, which are intended to define the scope of this invention.

I claim:

1. A cleaning device for a magnetic tape unit comprising at least one rotatable element, said device comprising:
    a housing;
    a supply reel mounted to the housing;
    a support surface included in the housing;
    a cleaning tape wound on the supply reel and extending between the supply reel and the support surface, such that the tape can be advanced from the supply reel to the support surface;
    means for holding the cleaning tape stationary during rotation of said at least one rotatable element of the tape unit to be cleaned;
    means for bringing an intermediate portion of the tape into contact with the at least one rotatable element of the tape unit such that rotary motion of the rotatable element cleans the rotatable element against the stationary tape, said intermediate portion situated between the supply reel and the support surface; and
    means for advancing the tape to bring a fresh portion of the tape into contact with the rotatable element.

2. The invention of claim 1 wherein the housing comprises a cassette shell.

3. The invention of claim 1 wherein the rotatable element comprises a capstan.

4. The invention of claim 1 wherein the rotatable element comprises a pinch roller.

5. The invention of claim 1 wherein the housing defines a channel adjacent the tape near the rotatable element, said channel acting to conduct liquids introduced into the channel onto the tape.

6. The invention of claim 1 wherein the at least one rotatable element comprises a pinch roller and a capstan; wherein the means for bringing an intermediate portion of the cleaning tape into contact places the cleaning tape between the capstan and the pinch roller; and wherein the invention further comprises means for enhancing frictional contact between the capstan and the pinch roller to ensure rotation of the capstan against the cleaning tape.

7. The invention of claim 1 wherein the advancing means comprises:
a take-up reel rotatably mounted to the housing and coupled to the tape to wind the tape; and
means for advancing the take-up reel.

8. The invention of claim 1 wherein the means for advancing the take-up reel comprising a thumb wheel drivingly coupled to the take-up reel and accessible from the outside of the housing.

9. A cleaning device for a magnetic tape unit comprising at least one rotatable element, said device comprising:
a housing;
a supply reel pivotably mounted to the housing;
a take-up reel pivotably mounted to the housing;
a cleaning ribbon mounted between the supply reel and the take-up reel such that the ribbon can be advanced from the supply reel to the take-up reel;
means for holding at least one of the supply reels and take-up reels and therefore the cleaning ribbon stationary during rotation of said at least one rotatable element of the tape unit to be cleaned;
means for bringing an intermediate portion of the cleaning ribbon into contact with the at least one rotatable element of a magnetic tape unit such that rotary motion of the rotatable element cleans the rotatable element against the stationary ribbon, said intermediate portion situated between the two reels; and
means for advancing the take-up reel to bring a fresh portion of the cleaning ribbon into contact with the rotatable element.

10. The invention of claim 9 wherein the housing defines a dispensing channel adjacent the ribbon near the rotatable element, said channel acting to conduct liquids introduced into the channel onto the ribbon.

11. The invention of claim 9 wherein the housing comprises a cassette shell.

12. The invention of claim 9 wherein the rotatable element comprises a capstan.

13. The invention of claim 9 wherein the rotatable element comprises a pinch roller.

14. The invention of claim 9 wherein the advancing means comprises:
a thumb wheel accessible from the outside of the housing and coupled to the take-up reel such that rotation of the thumb wheel causes the take-up reel to rotate; and
a ratchet pawl mounted to the housing and coupled to the take-up reel to prevent the take-up reel from rotating in a reverse direction.

15. The invention of claim 9 wherein the at least one rotatable element comprises a pinch roller and a capstan; wherein the means for bringing an intermediate portion of the cleaning ribbon into contact places the cleaning ribbon between the capstan and the pinch roller; and wherein the invention further comprises means for enhancing frictional contact between the capstan and the pinch roller to ensure rotation of the capstan against the cleaning ribbon.

16. A cleaning device for a magnetic tape unit having a pinch roller and a capstan positioned adjacent the roller, said device comprising:
a housing shaped to fit the tape unit adjacent the pinch roller and capstan;
a cleaning medium mounted to the housing and positioned to contact the pinch roller;
a traction sleeve sized to fit over the capstan;
means for holding the sleeve in place in the housing such that the sleeve is positioned to fit over the capstan between the capstan and the pinch roller; and
means for introducing a liquid into the housing onto the medium near the pinch roller;
said traction sleeve operating to enhance friction between the capstan and the pinch roller.

17. The invention of claim 16 wherein the sleeve is formed of an elastomeric material.

18. The invention of claim 16 wherein the sleeve covers a portion of the capstan offset with respect to the cleaning medium.

19. The invention of claim 16 wherein the sleeve covers a portion of the capstan aligned with the cleaning medium.

20. The invention of claim 16 wherein the housing comprises a cassette shell.

21. The invention of claim 16 further comprising:
a plunger mounted to the housing and positioned to push the medium against the pinch roller; and
means for biasing the plunger in the direction of the pinch roller to enhance the cleaning of the pinch roller by the medium as the pinch roller is rotated by the capstan.

22. The invention of claim 16 wherein the means for introducing comprises a channel defined in the housing adjacent the medium.

23. The invention of claim 16 wherein the cleaning medium comprises a cleaning ribbon.

24. The invention of claim 23 wherein the invention further comprises:
a supply reel rotatably mounted to the housing; and
a take-up reel rotatably mounted to the housing;
wherein the ribbon is mounted between the supply reel and the take-up reel such that rotation of the reels causes the ribbon to advance within the housing.

25. The invention of claim 24 wherein the invention further comprises:
means for rotating the take-up reel; and
ratchet means for preventing the take-up reel from rotating in a reverse direction.

26. A cleaning device for a magnetic tape unit comprising a capstan and a pinch roller positioned adjacent the capstan, said device comprising;
a cassette shell;
a supply reel rotatably mounted to the shell;
a take-up reel rotatably mounted to the shell;
a cleaning ribbon mounted between the supply reel and the take-up reel such that rotation of the reels in a forward direction advances the ribbon from the supply reel to the take-up reel;
a plunger mounted to the shell and positioned to push the ribbon against the pinch roller;
a spring positioned to bias the plunger against the ribbon;
an opening in the shell positioned to introduce a liquid onto the ribbon near the pinch roller; and
a traction sleeve rotatably mounted to the shell such that when the cleaning device is placed in the unit in a first orientation, the sleeve is interposed between the capstan and the pinch roller to enhance the frictional engagement of the capstan with the pinch roller.

27. The invention of claim 26 wherein the device further comprises:

a thumb wheel drivingly coupled to the take-up reel to rotate the take-up reel; and a ratchet pawl mounted to the shell to engage the thumb wheel to prevent the take-up reel from rotation in a reverse direction, opposed to the forward direction.

28. The invention of claim 26 wherein the traction sleeve is aligned with the ribbon.

29. The invention of claim 26 wherein the traction sleeve is offset with respect to the ribbon.

30. A cleaning device for a magnetic tape unit comprising a capstan and a pinch roller positioned adjacent the capstan, said device comprising:
- a cassette shell;
- a supply reel rotatably mounted to the shell;
- a take-up reel rotatably mounted to the shell;
- a cleaning ribbon mounted between the supply reel and the take-up reel such that rotation of the reels in a forward direction advances the ribbon from the supply reel to the take-up reel, and the ribbon passes between the capstan and the pinch roller when the shell is placed in the tape unit in a first orientation;
- a dispensing channel in the shell positioned to introduce a liquid onto the ribbon near the pinch roller; and
- a traction sleeve rotatably mounted to the shell such that, when the shell is placed in the tape unit in the first orientation, the sleeve is interposed between the capstan and the pinch roller to enhance the frictional engagement of the capstan with the pinch roller, to said traction sleeve being offset with respect to the ribbon in its operative position.

31. The invention of claim 28 wherein the device further comprises:
- a thumb wheel drivingly coupled to the take-up reel to rotate the take-up reel; and
- a ratchet pawl mounted to the shell to engage the thumb wheel to prevent the take-up reel from rotating in a reverse direction, opposed to the forward direction.

* * * * *